US012811986B2

(12) United States Patent
Petrone

(10) Patent No.: US 12,811,986 B2
(45) Date of Patent: *Nov. 24, 2026

(54) SECURE COMMUNICATIONS IN INTERACTIVE COMPUTING ENVIRONMENT

(71) Applicant: Alexander Petrone, Middlesex, NJ (US)

(72) Inventor: Alexander Petrone, Middlesex, NJ (US)

(73) Assignee: Alexander Petrone, Middlesex, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/070,209

(22) Filed: Mar. 4, 2025

(65) Prior Publication Data

US 2026/0143009 A1 May 21, 2026

Related U.S. Application Data

(63) Continuation of application No. 18/951,202, filed on Nov. 18, 2024, now Pat. No. 12,273,393.

(51) Int. Cl.
*H04L 9/40* (2022.01)

(52) U.S. Cl.
CPC ............ *H04L 63/20* (2013.01); *H04L 63/108* (2013.01)

(58) Field of Classification Search
CPC ..... H04L 63/20; H04L 63/108; H04L 41/044; H04L 41/04; H04L 41/28; H04L 63/08; H04L 63/10
See application file for complete search history.

(56) References Cited

U.S. PATENT DOCUMENTS 11,954,238 B1 * 4/2024 Tan ........................ H04L 9/0891
12,061,920 B2 * 8/2024 Unnikrishnan ..... G06F 9/45558
12,118,794 B1 * 10/2024 Folsom ............ G08B 13/19669
(Continued)

OTHER PUBLICATIONS

Tan et al., "A Hierarchy Controllable RBAC-Based User Access Control Model," 2009 Second International Conference on Intelligent Networks and Intelligent Systems Year: 2009 | Conference Paper | Publisher: IEEE.*
(Continued)

*Primary Examiner* — Roderick Tolentino
(74) *Attorney, Agent, or Firm* — Flaster Greenberg PC

(57) ABSTRACT

Embodiments are described herein for establishing, in an interactive computing environment operating via at least one server device, a first user with a first user access type for managing communications between a plurality of users. The first user access type may allow the first user to communicate directly via the interactive computing environment with a second user having a second user access type and a plurality of third users having a third user access type in. The second user access type may permit the second user to identify the third users based on identification parameters and a relationship between the third users and the first user in the interactive computing environment. The third user access type may prevent the third users from directly communicating with the second user without an approval of the first user to protect a privacy associated with the third user.

20 Claims, 10 Drawing Sheets

(56) References Cited

U.S. PATENT DOCUMENTS

| | | | | |
|---|---|---|---|---|
| 2011/0213789 | A1* | 9/2011 | Doshi | G06F 21/6218 707/754 |
| 2019/0394206 | A1* | 12/2019 | Zezza | H04L 63/105 |
| 2023/0153449 | A1* | 5/2023 | Li | G06F 21/6218 726/4 |
| 2024/0031340 | A1* | 1/2024 | Sahani | H04L 63/0421 |
| 2024/0104241 | A1* | 3/2024 | Omori | G06F 21/62 |
| 2024/0106830 | A1* | 3/2024 | Ibryam | H04L 63/0853 |
| 2024/0273234 | A1* | 8/2024 | Horwitz | G06F 21/6245 |

OTHER PUBLICATIONS

Badirova et al., “A Survey on Identity and Access Management for Cross-Domain Dynamic Users: Issues, Solutions, and Challenges,” IEEE Access Year: 2023 | vol. 11 | Journal Article | Publisher: IEEE.*

Din et al., “Secure and Privacy-Preserving Trust Management System for Trustworthy Communications in Intelligent Transportation Systems,” IEEE Access Year: 2023 | vol. 11 | Journal Article | Publisher: IEEE.*

* cited by examiner

SECURE COMMUNICATIONS IN INTERACTIVE COMPUTING ENVIRONMENT

CROSS-REFERENCE TO RELATED APPLICATIONS

This application is a continuation of U.S. Non-Provisional Ser. No. 18/951,202, filed Nov. 18, 2024.

BACKGROUND

Computing devices provide various applications and services for enabling communications between users. Some of these applications may allow users to freely communicate with one another or provide initial communications to other users. Many of these applications, however, fail to provide proper security or oversight by one or more users.

SUMMARY

Systems, methods, and apparatus are described herein for establishing, in an interactive computing environment operating via at least one server device, a first user with a first user access type for managing communications between a plurality of users. The first user access type may be configured to allow the first user to communicate directly via the interactive computing environment with at least one second user of the plurality of users having a second user access type in the interactive computing environment and a plurality of third users of the plurality of users having a third user access type in the interactive computing environment. The second user access type may permit the at least one second user to identify the plurality of third users based on identification parameters and a relationship between the plurality of third users and the first user in the interactive computing environment. The third user access type may prevent the plurality of third users from directly communicating with the at least one second user in the interactive communication environment without an approval of the first user to protect a privacy associated with the at least one third user.

Communication requests may be received from the plurality of third users to communicate with the at least one second user based on predefined communication parameters. The predefined communication parameters may comprise a timeframe for requesting communication, a geographical location, and/or a communication purpose associated with the communication request.

The communication requests may be queued from the plurality of third users for approval by the first user. Each communication request may be queued with a time period for expiration. A communication approval may be received from the first user for permitting the communication requests to be sent to the at least one second user according to the predefined communication parameters. Communications may be communicated, based on the communication approval from the first user, to the at least one second user according to the predefined communication parameters. The timeframe may be initiated for expiration of each of the communication requests that have received the communication approval after communicating the communication requests. A communication request may be received, from the at least one second user, for a communication to a third user of the plurality of third users within the timeframe. The communication request may comprises a communication purpose. The first user may be notified of the communication request to the third user. The first user may be notified when a period of time has passed since the second user sending the communication request to the third user. An acceptance of the communication request may be received from the second user. Any communication requests from the plurality of third users with a same communication purpose may be cleared from the queue.

DETAILED DESCRIPTION

Figure 1:
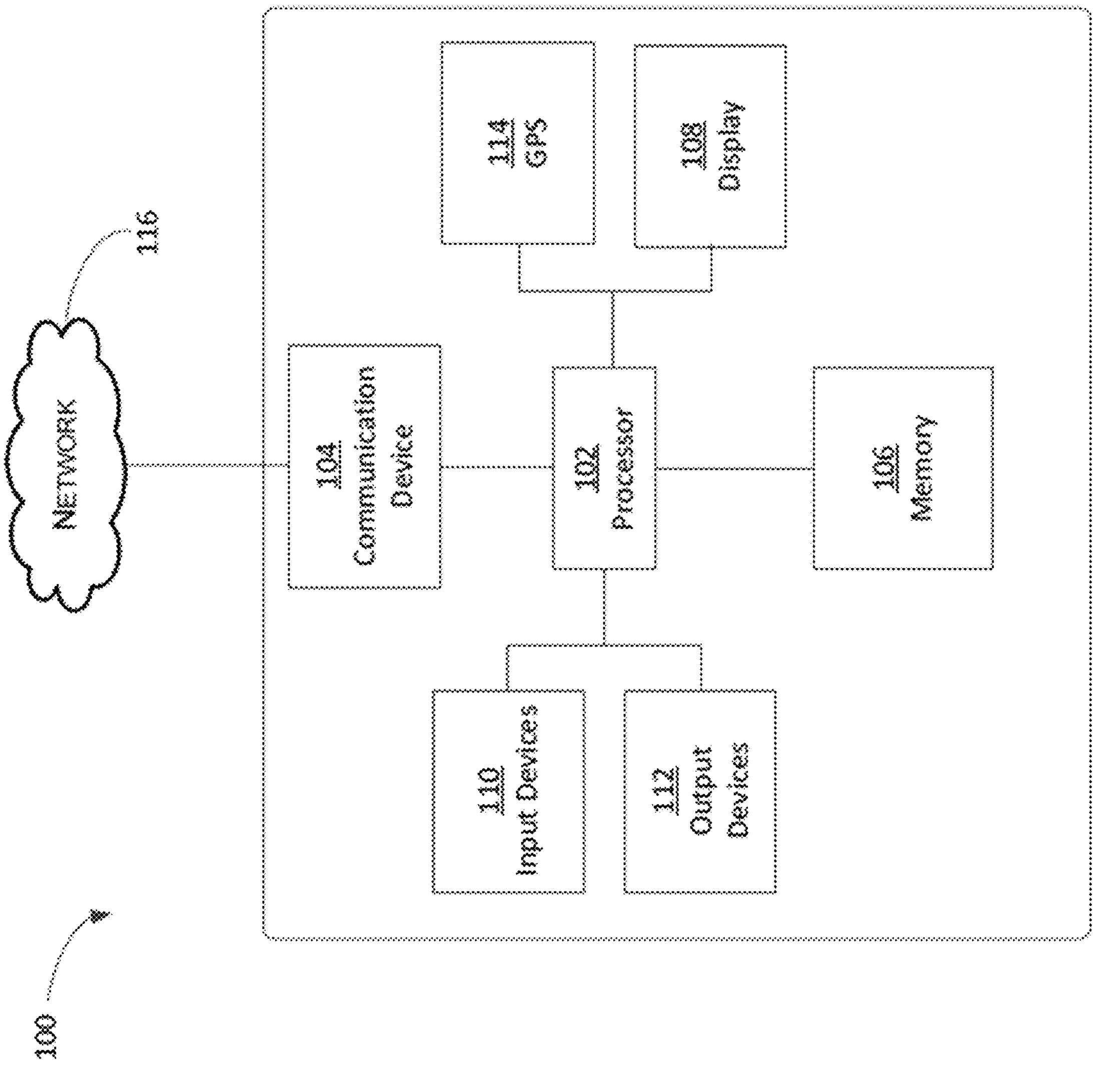
FIG. 1 illustrates a block diagram of an example computing device.

FIG. 1 illustrates a block diagram of an example computing device 100. The computing device 100 may include a personal computer, such as a laptop or desktop computer, a tablet device, a cellular phone or smartphone, a server, or another type of computing device. The computing device 100 may include a processor 102, a communication interface 104, a memory 106, a display 108, input devices 110, output devices 112, and/or a GPS circuit 114. The computing device 100 may include additional, different, or fewer components.

The processor 102 may include one or more general purpose processors, special purpose processors, conventional processors, digital signal processors (DSPs), microprocessors, integrated circuits, a programmable logic device (PLD), application specific integrated circuits (ASICs), or the like. The processor 102 may perform signal coding, data processing, image processing, power control, input/output processing, and/or any other functionality that enables the computing device 100 to perform as described herein.

The processor 102 may store information in and/or retrieve information from the memory 106. The memory 106 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may be local memory or remote memory external to the computing device 100. The memory 106 may store instructions which are executable by the processor 102. Different information may be stored in different locations in the memory 106.

The processor 102 that may communicate with other devices via the communication device 104. The communication device 104 may transmit and/or receive information over the network 116, which may include one or more other computing devices. The communication device 104 may perform wireless and/or wired communications. The communication device 104 may include a receiver, transmitter, transceiver, or other device capable of performing wireless communications via an antenna. The communication device 104 may be capable of communicating via one or more protocols, such as a cellular communication protocol, a Wi-Fi communication protocol, Bluetooth®, a near field communication (NFC) protocol, an internet protocol, another proprietary protocol, or any other radio frequency (RF) or other communications protocol. The computing device 100 may include one or more communication devices 104.

The processor 102 may be in communication with a display 108 for providing information to a user. The information may be provided via a user interface on the display 108. The information may be provided as an image generated on the display 108. The display 108 and the processor 102 may be in two-way communication, as the display 106 may include a touch-screen device capable of receiving information from a user and providing such information to the processor 102.

The processor 102 may be in communication with a GPS circuit 114 for receiving geospatial information. The processor 102 may be capable of determining the GPS coordinates of the wireless communication device 100 based on the geospatial information received from the GPS circuit 114. The geospatial information may be communicated to one or more other communication devices to identify the location of the computing device 100.

The processor 102 may be in communication with input devices 110 and/or output devices 112. The input devices 110 may include a camera, a microphone, a keyboard or other buttons or keys, and/or other types of input devices for sending information to the processor 102. The display 108 may be a type of input device, as the display 108 may include touch-screen sensor capable of sending information to the processor 102. The output devices 112 may include speakers, indicator lights, or other output devices capable of receiving signals from the processor 102 and providing output from the computing device 100. The display 108 may be a type of output device, as the display 108 may provide images or other visual display of information received from the processor 102.

Figure 2:
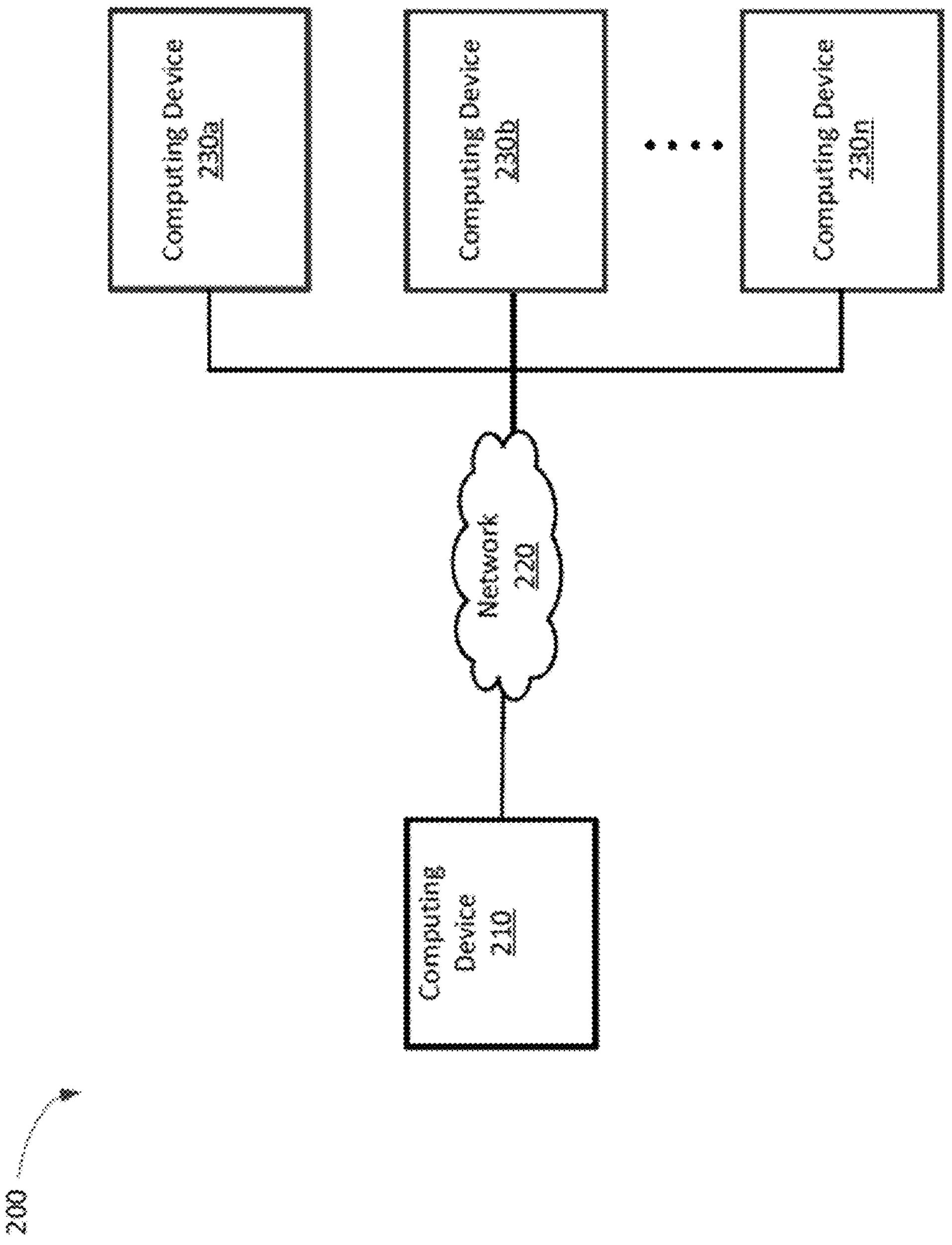
FIG. 2 illustrates a block diagram of an example computing network system.

FIG. 2 illustrates a block diagram of an example computing network system 200. The computing network system 200 may include one or more computing devices 230*a*-230*n* that may be capable of communicating digital messages with one another, either directly or via the network 220. The computing devices 230-230*n* may be user devices capable of logging into a session of an interactive computing environment and providing real-time interactive data via the network 220. The network 220 may include a wired and/or wireless network. For example, the network 220 may include a Wi-Fi communication network, a Wi-MAX communication network, a cellular communication network (e.g., CDMA, HSPA+, LTE, etc.), and/or a television white space (TVWS) communication network. The network 220 may include one or more communication networks.

The one or more computing devices 230*a*-230*n* may be capable of communicating digital messages to and/or receiving digital messages from the computing device 210 via the network 220. The computing device 210 may be a server, such as a web server, for providing a user interface to the computing devices 230*a*-230*n*. The computing device 210 may be in communication with an application executing locally on the computing devices 230*a*-230*n* for providing a user interface at the computing devices. The display of information may be generated locally at the computing devices 230*a*-230*n* or at the computing device 210 and provided via an application (e.g., a web browser) at the computing devices 230*a*-230*n*. Though a single computing device 210 is provided, one or more computing devices or server computing devices may be similarly implemented for operating as described herein. One or more of the computing devices 230*a*-230*n* may be operated by one or more users having a user access type capable of communicating messages in an interactive computing environment that may be stored and/or operated via the computing device 210, as described herein.

FIGS. 3A-3D illustrate an example system flow diagram 300 that may be implemented to establish users having defined access types for performing secure communications in an interactive computing environment. The method 300, or portions thereof, may be performed at a computing device or may be distributed across multiple computing devices (e.g., one or more server devices and/or one or more user devices). One or more portions of the system flow diagram 300 may be stored in memory as computer-readable and/or machine-readable instructions that may be executed by at least one control circuit and/or by one or more processing devices. The system flow diagram 300 may be executed by one or more processing devices (e.g., computing device 210, computing device 230*a*, computing device 230*b*, computing device 230*n*, etc.). Though portions of the system flow diagram 300 may be described herein as being performed by a particular device, the portions of the system flow diagram 300 may be performed by another device and/or distributed across one or more (e.g., multiple) devices (e.g., computing device 210, computing device 230*a*, computing device 230*b*, computing device 230*n*, etc.). The system flow diagram 300, or portions thereof, may be performed to enable users have certain permissions and/or controls to enable secure communications that may be enabled with oversight and security in the interactive computing environment. In examples, one or more processors of one or more processing devices, such as a user device, may execute a local application for performing one or more portions of the system flow diagram 300.

Figure 3A:
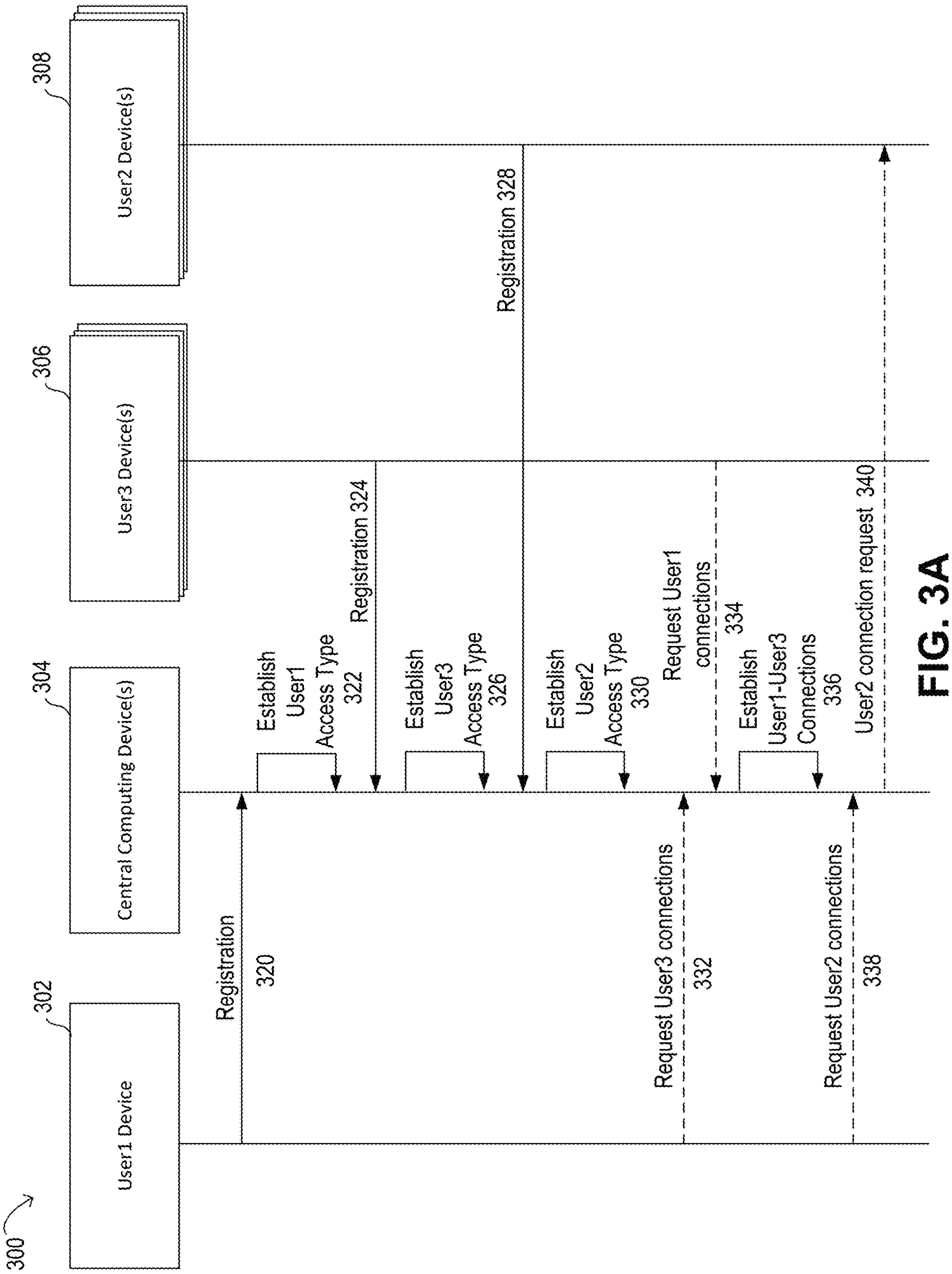
FIG. 3A-3D is a flow diagram of an example system flow diagram that may be implemented for enabling communications in an interactive computing environment.

As illustrated in FIG. 3A, a first user operating at a first user device 302 may access and/or log into the interactive computing environment and send a registration message at 320 for establishing a first user access type for managing communications between a plurality of users in the interactive computing environment. The interactive communication environment may be operating via at least one central computing device 304, such as one or more server device and/or over a communication network. The first user may select a first user access type with which to be registered and the registration message at 320 may identify the first user access type. The registration message may be transmitted at 320 as a secure protocol (e.g., HTTP, HTTP Secure (HTTPS)) request(s). Each HTTP protocol request may include one or more parameters. HTTP protocol requests may include secure-encrypted keys. Though a single first user is provided as an example, the first user may be included in an account or team of first users capable of having similar access or shared access across second users and third users, or certain second users and third users associated with a first user may be selected for being shared with other first users on the team, which could give access to shared second users and third users for enabling communication, as described herein.

One or more central computing devices 304 may receive the registration message at 320. The central computing device 304 may register the first user and establish the first user access type at 322. For example, the registration message may include registration information, such as username, password, and/or other authentication information that may be used to register the user as having a first user access type. The registration message may include personal or private information, such as a name, phone number, address, or email address of the user. The registration message may include business information, such as a name, phone number, address, or email address of a business. The registration message may include a location or location information that may be used to register the first user for communicating with other users in the interactive computing environment that are associated with the same geographic location or location information. The first user access type may be in an administrator or facilitator role for controlling or permitting communications or access between other users in the system. The first user access type may be configured to allow the first user to communicate (e.g., directly) via the interactive computing environment over a communication network with at least one second user of the plurality of users having a second user access type in the interactive computing environment and/or a plurality of third users of the plurality of users operating having a third user access type in the interactive computing environment.

As illustrated in FIG. 3A, one or more second users operating at second user devices 308 may access and/or log into the interactive computing environment and send a registration message at 328 for establishing a second user access type for performing communications with other users in the interactive computing environment. The second user may select a second user access type with which to be registered and the registration message at 328 may identify the second user access type. The second user may receive an invite or request from the central computing device 304 or the first user device 302 and the registration message at 328 may be sent in response to an invite or registration request from the first user. The invite or registration request may be sent to an email address, cell phone number, or another electronic destination with a link for allowing the user to register having a second user access type. The first user may select the user access type for other users that are invited to register in the interactive computing environment. The registration message may be transmitted at 328 as a secure protocol (e.g., HTTP, HTTP Secure (HTTPS)) request(s). Each HTTP protocol request may include one or more parameters. HTTP protocol requests may include secure-encrypted keys.

One or more central computing devices 304 may receive the registration message at 328. The central computing device 304 may register the second user and establish the second user access type at 330. For example, the registration message may include registration information, such as username, password, and/or other authentication information that may be used to register the user as having a second user access type. The registration message may include personal or private information, such as a name, phone number, address, or email address of the user. The registration message may include business information, such as a name, phone number, address, or email address of a business. The registration message may include a location or location information that may be used to register the first user for communicating with other users in the interactive computing environment that are associated with the same geographic location or location information. The registration message may include a location or location information that may be used to register the second user for communicating with other users in the interactive computing environment that are associated with the same geographic location or location information. The registration message may include information about the user, types of desired communications, types of services desired, and/or information about the user or location (e.g., property) of the user that may generate labels stored with the user in the interactive computing environment and/or displayed when the user is identified in the interactive computing environment. The second user access type may be protected from receiving communications from other users in the interactive computing environment without permissions being given for enabling communications by the first user. The second user having the second user access type may perform direct communications with the first user having the first user access type, but be protected from receiving communications from other users in the interactive computing environment (e.g., other first users having first user access type and/or third users having third user access types).

One or more third users operating at third user devices 306 may access and/or log into the interactive computing environment and send a registration message at 324 for establishing a third user access type for performing communications with other users in the interactive computing environment. The third user may select a third user access type with which to be registered and the registration message at 324 may identify the third user access type. The third user may receive an invite or request from the central computing device 304 or the first user device 302 and the registration message at 324 may be sent in response to an invite or registration request from the first user. The invite or registration request may be sent to an email address, cell phone number, or another electronic destination with a link for allowing the user to register having a third user access type. The first user may select the user access type for other users that are invited to register in the interactive computing environment. The registration message may be transmitted at 324 as a secure protocol (e.g., HTTP, HTTP Secure (HTTPS)) request(s). Each HTTP protocol request may include one or more parameters. HTTP protocol requests may include secure-encrypted keys.

The third users may be labeled differently within the system for filtering different types of third users. For example, the third users may include different types of vendors, service providers, business types, or other types of users that may be separately labeled within the interactive computing environment. The registration message at 324 may include one or more labels with which the third user desires to be associated in the interactive computing environment. In another example, the first user may label the third users by providing a label in the request or labeling the third users once they have been registered and/or connected to the first user in the interactive user environment.

One or more central computing devices 304 may receive the registration message at 324. The central computing device 304 may register the third user and establish the third user access type at 326. For example, the registration message may include registration information, such as username, password, and/or other authentication information that may be used to register the user as having a third user access type. The registration message may include personal or private information, such as a name, phone number, address, or email address of the user. The registration message may include a location or location information that may be used to register the third user for communicating with other users in the interactive computing environment that are associated with the same geographic location or location information. The third user access type may be prevented from sending communications to other users (e.g., second users) in the interactive computing environment without permissions being given for enabling communications by the first user. The third user access type may be prevented from performing such communications to protect a privacy associated with the at least one second user without authorization. The registration message may include one or more labels. The third user having the third user access type may perform direct communications with the first user having the first user access type, but be prevented from sending communications to other users in the interactive computing environment (e.g., other first users having first user access type and/or second users having second user access types).

The second and third users, having respective second user access types and third user access types, may each be stored in the interactive computing environment with one or more first users having a first user access type to create a network or users for enabling communications. For example, the first user may send a request for third user connections at 332 and/or third users may send requests for a connection to the first user at 334. The request at 332 may include an identifier of the third user to which the first user desires to be connected within the interactive computing environment. The request at 334 may include an identifier of the first user to which the third user desires to be connected within the interactive computing environment. The request may include a location identifier or location information associated with the first user and/or the third user. The requests may be queued at the one or more central computing devices 304 for being accepted by the respective users. Each request may expire and be deleted from the queue of the user's account after a predefined period of time, or be removed after the one or more central computing devices 304 receive a rejection. The period of time may be used to manage storage resources at the central computing device 304.

The one or more central computing devices 304 may establish a connection between the first user and the third user at 336. For example, the one or more central computing devices 304 may establish a secure connection between the first user and the third user in the interactive computing environment after acceptance of a request or an indication of acceptance of the connection by each user. The secure connection may be established with authentication information and/or encrypted keys that may be provided by each user when establishing or performing communications between the users. The connection may be established at 336 to enable second users having the second user access type to identify (e.g., via a search) the one or more third users with which the first user has access through the interactive computing environment. The connection may be established at 336 to enable the third user having the third user access type to submit requests for communication with one or more second users with which the first user has access through the interactive computing environment. The connection may be established at 336 to enable the third user having the third user access type to identify (e.g., via a search) the one or more second users with which the first user has access through the interactive computing environment. Absent the connection being established at 336, the third user may be prevented from identifying or submitting requests for communication with the one or more second users with which the first user has access through the interactive computing environment. The first user may remove the establishment of the connection to the third user, which may prevent the third user from having access to or identifying second users with which the first user has access through the interactive computing environment.

The first user may send a request for second user connections at 338. The request at 338 may include an identifier of the second user to which the first user desires to be connected within the interactive computing environment. The request may be queued at the one or more central computing devices 304 for being accepted by the third user. Each request may expire and be deleted from the queue of the user's account after a predefined period of time, or be removed after the one or more central computing devices 304 receive a rejection. The period of time may be used to manage storage resources at the central computing device 304.

Figure 3B:
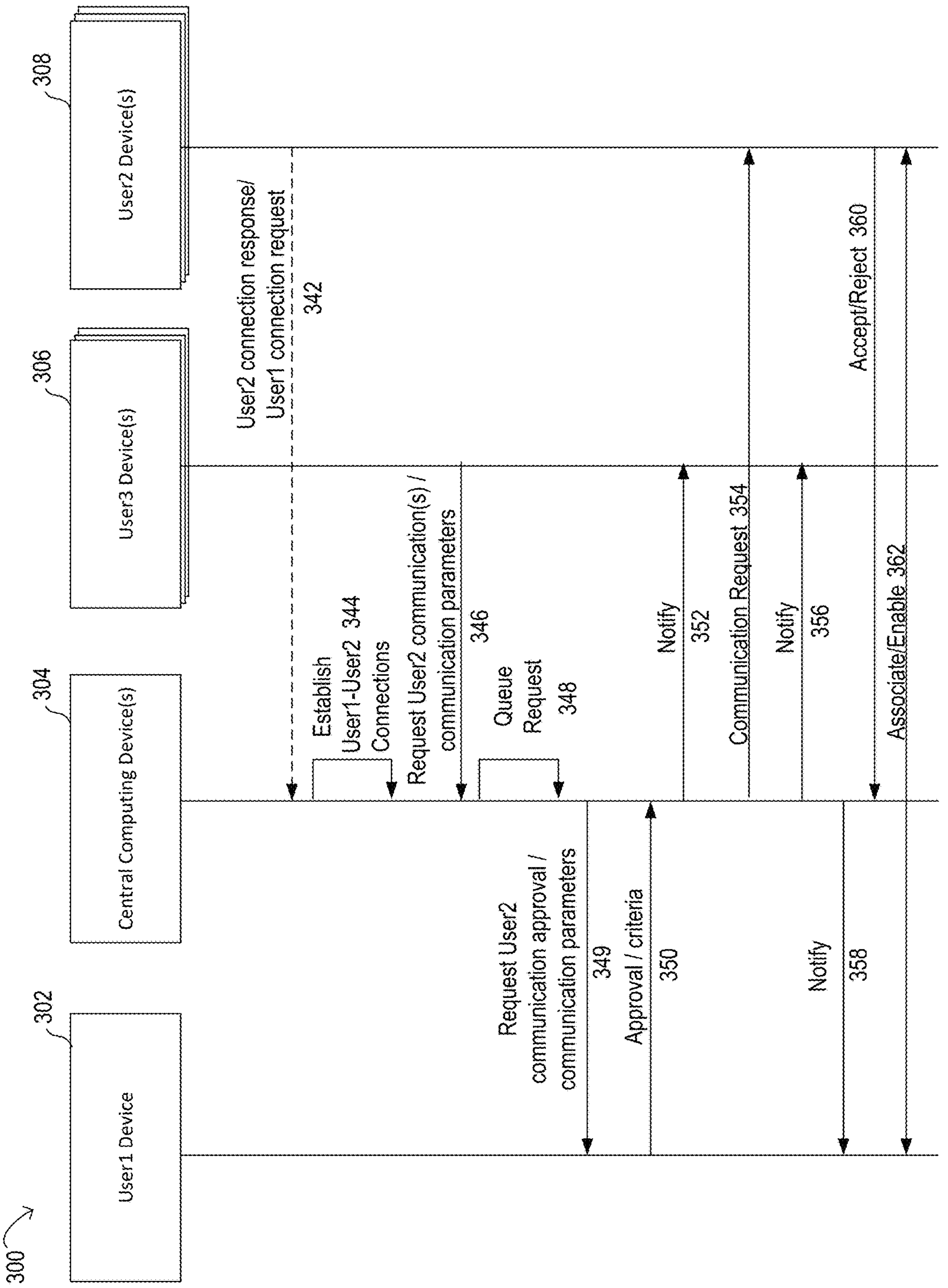

The one or more central computing devices 304 may send a request for the first user to connect to the second user (e.g., logged in at the second user device 308) when the user logs in to the interactive computing environment at 340. The request may include an identifier of the first user and/or the second user in the interactive computing environment. The request may be sent with the request for the second user to be registered in the interactive computing environment. The request may include a location identifier or location information associated with the first user and/or the second user. As shown in FIG. 3B, the second user may send a response to the request at 342. Additionally, or alternatively, the second user may send a request send a request at 342 to connect with the first user. The message at 342 may include an identifier of the first user and/or the second user in the interactive computing environment. The message at 342 may include a location identifier or location information associated with the first user and/or the second user.

The one or more central computing devices 304 may establish a connection between the first user and the second user at 344. For example, the one or more central computing devices 304 may establish a secure connection between the first user and the third user in the interactive computing environment after acceptance of a request or an indication of acceptance of the connection by each user. The secure connection may be established with authentication information and/or encrypted keys that may be provided by each user when establishing or performing communications between the users. The connection may be established at 344 to enable the second user having the second user access type to submit requests for communication with one or more third users with which the first user has access through the interactive computing environment. The connection may be established at 344 to enable the second user having the second user access type to identify (e.g., via a search) the one or more third users with which the first user has access through the interactive computing environment. The connection may be established at 344 to enable the second user to be identified by and/or receive communications from third users via the first user to which the connection is established. Absent the connection being established at 344, the second user may be prevented from being identified or receiving requests for communication with the one or more third users with which the first user is connected through the interactive computing environment. The first user or the second user may remove the establishment of the connection.

At 346, a third user may send a request for one or more communications with second users to which the first user is connected. The request 346 may include an identifier of the first user to which the request is being sent. The request at 346 may include one or more communication parameters. The communication parameters may include an identifier of one or more specific second users. For example, the third user may search for second users with which the first user is connected in the interactive computing environment and send a request for communicating with particular second users. The communication parameters may include a location identifier or location information with which the second users may be associated in the interactive computing environment. The request at 346 may include an identifier of the third user and/or a label associated with the type of third user making the request. The request at 346 may include a time period and/or an interval for which communications may be requested. For example, the third user may be a vendor of services and request a communication related to those services once a week for a period of 3 months. The request at 346 may include the text of the communication and/or a purpose of the communication to be sent to the second user for approval by the first user.

One or more requests may be received by the one or more central computing devices 304 at 346 from third users and queued at 348 for being accessed by the first user at 349. Each request may be queued for a predefined period of time before being removed from the queue. This may save on storage requirements of the interactive computing environment. In one example, the first user may request access to the queued requests for communication by selection on a user interface. When the first user logs into the interactive computing environment and/or provides input to receive the requests, the first user may receive or access the requests for communication from the third users at 349 for communication approval. The communication parameters may be reviewed by the first user. The first user may approve or reject the one or more of the communication requests from the third users. A rejection of the communication requests may remove the request from the queue. In response to the acceptance of the communication request, an approval message may be sent at 350. The first user may update the communication parameters for enabling the communication with the one or more second users based on the updated communication parameters. The first user may also add additional criteria for enabling the communication. The updated criteria may include additional communication parameters or other restrictions (e.g., time restrictions, etc.) for enabling the communications with the one or more second users. The additional criteria may include authentication information for allowing the third user to perform communications to ensure proper user authorization.

The one or more central computing devices 304 may receive the approval message at 350 and enable the communication according to the communication parameters and/or additional criteria. At 352, the one or more central computing devices 304 may notify the third user at the third user device 306 of the approval and/or the updated communication criteria. The third user may approve the updated criteria or reject. After the approval, the communication may be enabled according to the communication parameters and/or the third user and the one or more second users may be associated with each other in storage at the one or more central computing devices 304 for enabling communication at 362.

In one example, the one or more central computing devices 304 may enable direct communication between the third user and the one or more second users via the interactive computing environment, if such direct communication is authorized by the first user and/or according to the approved communication parameters and/or additional criteria. The one or more central computing devices 304 may automatically transmit communications to the one or more second users according to the approved communication parameters and/or additional criteria. For example, the one or more central computing devices 304 may send a message having text received from the third user and/or edited by the first user at predefined periods of time and/or with predefined frequency.

The communication may be approved by the one or more second users prior to enabling the communication. For example, the one or more central computing devices 304 may send a communication request to the one or more second users at 354. The one or more central computing devices 304 may notify the third user at 356 and/or the first user at 358 that the communication request was sent at 354 by transmitting respective messages to the users. The second user may accept or reject the communication request and a corresponding message may be sent to one or more central computing devices 304 at 360. If the second user accepts the communication request, the communication may be enabled according to the communication parameters and/or the third user and the one or more second users may be associated with each other in storage at the one or more central computing devices 304 for enabling communication at 362. The second user may update the communication parameters and/or other criteria for defining the communication parameters and/or other criteria by which they wish to receive the communications. The communication parameters and/or other criteria may be transmitted back to the one or more central computing devices 304 for enabling the communication. The first user, the second user, and/or the third user may each submit a message to the one or more central computing devices 304 for canceling the communications or the ability to communicate between the third user and the second user via the interactive computing environment. The communications may be sent via HTTP protocol requests. Each communication may include secure-encrypted keys. Though communications may be enabled to be transmitted to the one or more second users through the interactive computing environment, information associated with the one or more second users (e.g., personal or private information, such as a name, phone number, address, or email address, or predefined portions thereof) may fail to be provided or accessible to the third user to protect the privacy of the second user.

Figure 3C:
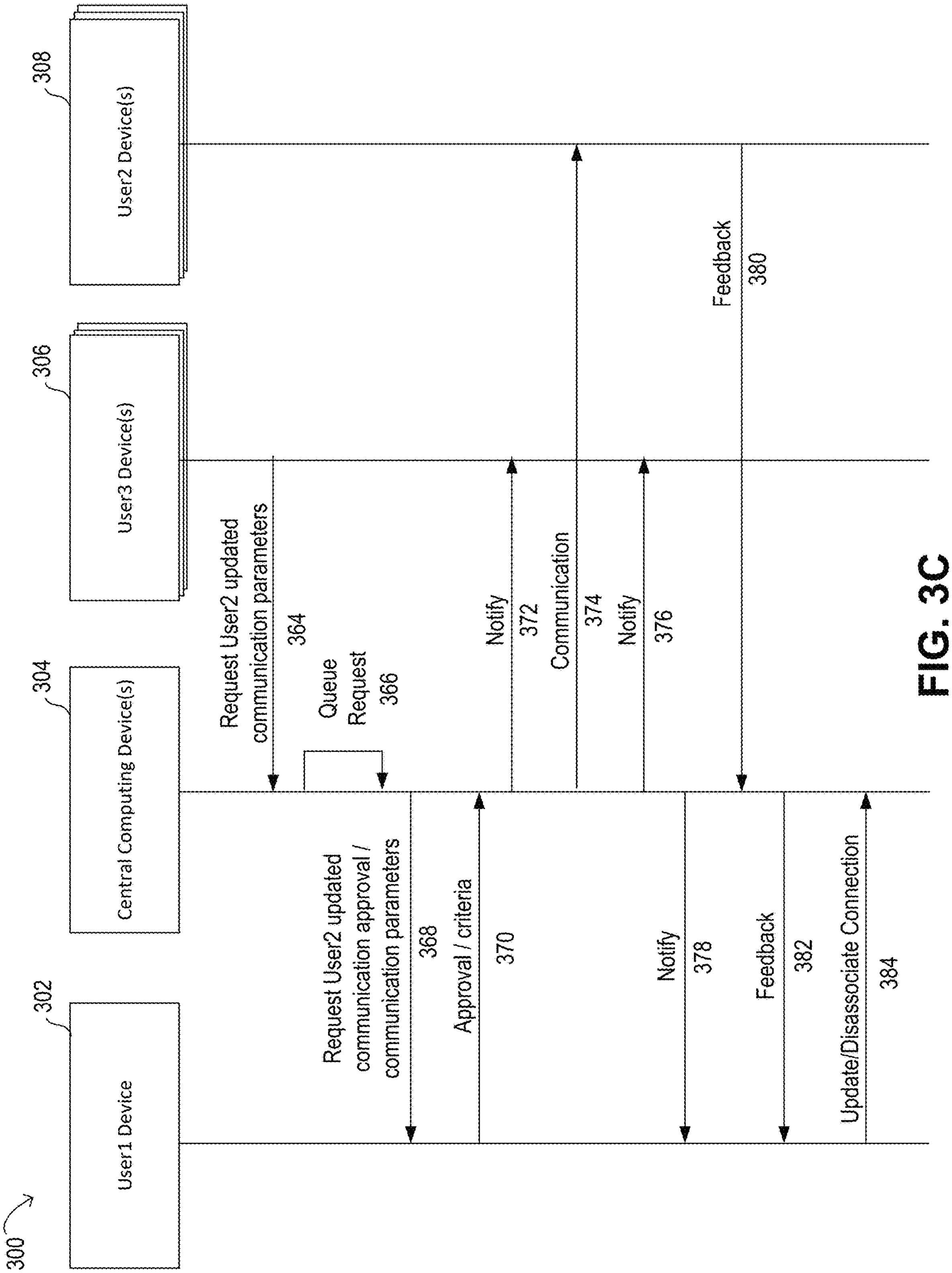

As shown in FIG. 3C, a third user may request updated communication parameters at 364. For example, the third user may update prior communication parameters or send a request for another update to the communication parameters. The updated communication parameters may be queued at 366 for being accessed by the first user at 368. For example, the first user may request access to the queued updates to communication parameters by selection on a user interface. When the first user logs into the interactive computing environment and/or provides input to receive the requests, the first user may receive or access the updated communication parameters from the third users at 368 for communication approval. The communication parameters may be reviewed by the first user. The first user may approve or reject the updates from the third users. A rejection of the updated parameters may remove the request from the queue and/or maintain the request with the prior communication parameters. In response to the acceptance of the communication request, an approval message may be sent at 370. The first user may update the requested changes to the communication parameters for enabling the communication with the one or more second users based on the updates. The first user may also add additional criteria for enabling the communication. The updated criteria may include additional communication parameters or other restrictions (e.g., time restrictions, etc.) for enabling the communications with the one or more second users. The additional criteria may include authentication information for allowing the third user to perform communications to ensure proper user authorization.

The one or more central computing devices 304 may receive the approval message at 370 and enable the communication according to the updated communication parameters and/or additional criteria. At 372, the one or more central computing devices 304 may notify the third user at the third user device 306 of the approval and/or the updated communication criteria. The third user may approve the updated criteria or reject. After the approval, the communication may be enabled according to the updated communication parameters for enabling communication at 374.

The first user and/or the third users may be notified by the one or more central computing devices when a communication is sent and/or received by the second user or the third user. In one example, the one or more central computing devices 304 may send a communication at 374 to a second user. The one or more central computing devices 304 may notify the first user of the communication at 374 via a notification message at 378. The one or more central computing devices 304 may notify the second user of the communication at 374 via a notification message at 376.

The communication at 374 may be sent with an identification of the first user and/or the third user. For example, the communication at 374 may identify the third user from which the communication was initially requested. The communication at 374 may include information provided by the third user and/or updated by the first user, or that originated from the first user. The communication at 374 may identify the first user as the sender of the communication. For example, the communication 374 may be an automatically generated communication at the one or more central computing devices 304 (e.g., generated according to the communication parameters), and may identify the first user as the sender of the communication. In one example, the first user may be an agent with which the second user has a relationship and the communication may be sent to simulate a communication from the first user and introducing the third user and/or services associated with the first user (e.g., which may be provided based on the label of the third user type). In another example, the communication at 374 may identify the third user as the person from who the communication is sent and the information in the message may include an identification that the third user is connected to the first user. The one or more central computing devices 304 may provide authentication information in the communication to authenticate the connection between the first user and the third user in the communication.

The second user may provide feedback to the one or more central computing devices 304 at 380. The feedback may be related to the communications and/or the one or more third users. For example, the feedback may be related to services provided by the one or more third users. The one or more central computing devices 304 at 380 may receive the feedback from the second user and provide the feedback at 382 to the first user. The feedback may be used at the one or more central computing devices 304 to update the feedback (e.g., a rating, text, etc.) displayed with the third users when they are identified as a connection through the first user.

Based on the feedback, the first user may update communication parameters, update or disassociate connections, or perform other actions at 384 for updating communications through the first user in the interactive computing environment. For example, based on the feedback the first user may update the communication parameters for enabling communication between the one or more third users and the second user. Based on the feedback, the first user may disassociate or disable communication between the one or more third users and the second user the communication parameters for enabling between the one or more third users and the second user. Based on the feedback, the first user may disassociate or disconnect with the one or more third users themselves in the interactive computing environment. The disconnection or disassociation may prevent the third users from being searchable or identifiable by second users through the first user and/or prevent communication between the third users and the second user through the first user in the interactive computing environment.

As described herein, the third users may establish a connection to the first user in the interactive computing environment for enabling communication with one or more second users. In one example, the privacy of the second users may be protected in the interactive computing environment by limiting the number of communications transmitted from a third user to one or more second users via a first user. If a third user is connected to multiple first users, the limit may be a limit on the total number of communications within a predefined period of time, or a total number of communications through a given first user within a predefined period of time.

The limit on the number of communications may also reduce network communication, processing, and memory resources that may be utilized in the interactive computing environment. The communications may also, or alternatively, be limited to a number of second users. The limited number of communications may be referred to as a prioritized communication. The third user may be provided with a list of second users with which a first user is connected and select the second users to which to send the communication. The list of second users may include an indicator of second users that have requested a communication type or service type (e.g., indicated by one or more labels in the system). The communication type or service type may relate to the one or more labels stored for the third user in the one or more central computing devices 304. The list of second users may include information about the user, an indication of types of desired communications, an indication (e.g., labels) of types of services desired, and/or information about the user or location (e.g., property) of the user displayed when the user is identified in the list of second users. Outside of the limited number of communications or prioritized communications within the predefined period of time, the third users may be prevented from sending or initiating communications to second users. However, second users may be able to initiate communications and/or communicate with third users via a first user without similar limitations or restrictions on communications.

Figure 3D:
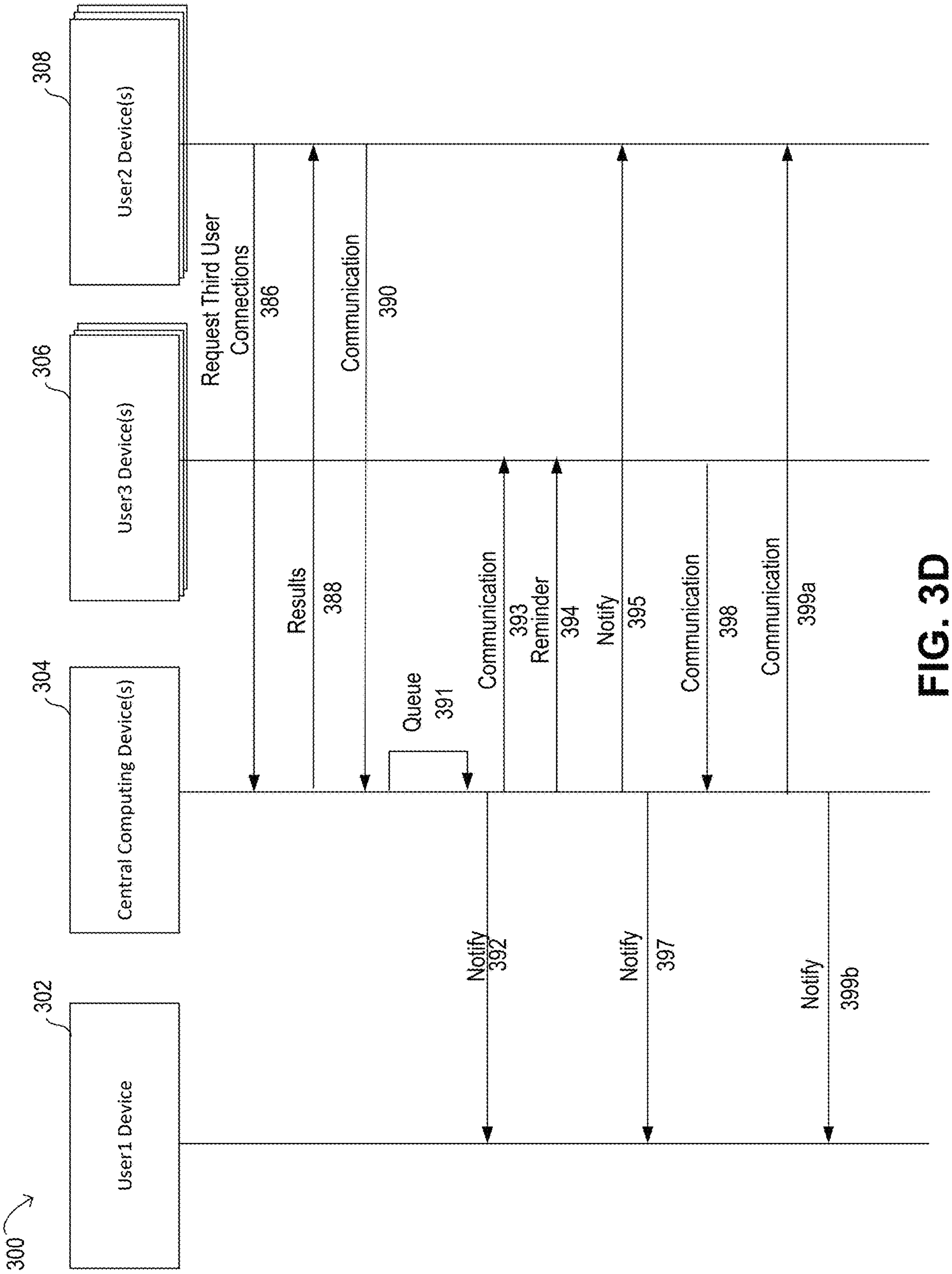

As shown in FIG. 3D, a second user may send a request at 386 to the one or more central computing devices 304 for third users connections associated with the first user. For example, the second user may be connected with multiple first users and may request third user connections of one or more first users. The second user may be provided with the third user connections of the first user at 388. The third user connections may be displayed with information related to the third user connections. For example, the third user connections may each be displayed with personal, private information, or business information, such as a name, phone number, address, email address of the user, a business name, a business phone number, a business address, or an email address of a business. The third user connections may be displayed with a location or location information. The third user connections may be displayed with types of desired communications, types of services offered, and/or labels stored with the user in the interactive computing environment. The third user connections may be displayed with the feedback (e.g., a rating, text, etc.) from other second users and/or first users. The second user may identify one or more third users with which to initiate and/or establish a communication.

At 390, a communication may be sent to the one or more central computing devices 304. The communication may operate as a communication request. The communication may identify the second user and/or information associated with the second user. The communication may identify the first user with which the second user and the third user are connected in the interactive computing environment. The communication may identify parameters, such as a type of communication or type of services requested. The communication may include other parameters, such as a message. The communication may identify information about the second user, an indication of types of desired communications, an indication (e.g., labels) of types of services desired, and/or information about the user or location (e.g., property) of the second user. The communication may include a document or image (e.g., video or still image) shared by second user in the initial request for communication that includes information in the initial request for communication.

The one or more central computing devices 304 may queue the communication at 391 for sending to the one or more third users upon logging into the interactive computing environment and/or upon request. The third users may accept or reject the communication request from second users. A third user may reject the communication request from a second user and provide a reason for rejection. The rejection may be one of a predefined number of responses provided to the third user or a custom response.

The one or more central computing devices 304 may notify the first user at 392 when the communication is received at 390 and/or is queued. The second user and/or the third user may be identified to the first user as being in communication. The one or more additional portions of the communication described herein may be provided in the notification to the first user. The communication may be removed from the queue after a predefined period of time. This may save on memory resources in the interactive computing environment.

The one or more central computing devices 304 may provide the communication to the one or more third users at 393. For example, the communication from the second user may be provided to a third user upon logging into the interactive computing environment and/or requesting the queued communication. After the communication is provided or accessed by the third user another notification may be provided to the first user. The one or more central computing devices 304 may also monitor for return communications from the third user to the second user and send reminders to the third user to respond to the communication from the second user. For example, the one or more central computing devices 304 may send a reminder at 394 to the third user the next time the user logs into the interactive computing environment and/or at predefined periods of time after the receipt of the communication without a return communication.

The one or more central computing devices 304 may notify the first user when an amount of time has elapsed since receiving the communication, a reminder has been sent to the third user, and/or an amount of time has elapsed since a reminder was previously sent. For example, one or more central computing devices 304 may notify the first user at 397. The notification may identify a time since the prior communication, the communication, the third user, and/or the second user from which the communication was sent. Additionally, or alternatively, the one or more central computing devices 304 may notify the second user at 395 that the communication was identified and request a response from the second user indicating whether the third user contacted the second user (e.g., via an alternative form of communication, such as email, phone call, etc.). For example, the communication at 390 may have included information for facilitating communication through another communication medium outside of the interactive computing environment. The notification at 395 may be simulated to appear as if it is a message sent from the first user. The notification at 395 may be sent a predefined period of time after receiving the communication at 390 and/or before sending the reminder at 394. The second user may respond at 396 indicating whether they received a communication from the one or more third users (e.g., via an alternative form of communication, such as email, phone call, etc.). The one or more central computing devices 304 may notify the first user as to whether the one or more third users communicated with the second user (e.g., via an alternative form of communication, such as email, phone call, etc.).

The third user may send a communication via the interactive computing environment at 398 to the second user. The one or more central computing devices 304 may receive the communication and transmit a communication 399*a* to the second user. The one or more central computing devices 304 may notify the first user of the communication from the third user to the first user at 399*b*.

When a second user sends an initial communication to third users in the interactive computing environment for communication, the communication may be treated as a request until the third user accepts the request. Prior to accepting the request for communication from a second user, certain information described herein (e.g., personal or private information, including location information) stored in the interactive computing environment and/or sent in communications may be prevented from being displayed to the third user. This may further protect the privacy of the second user.

Figure 4A:
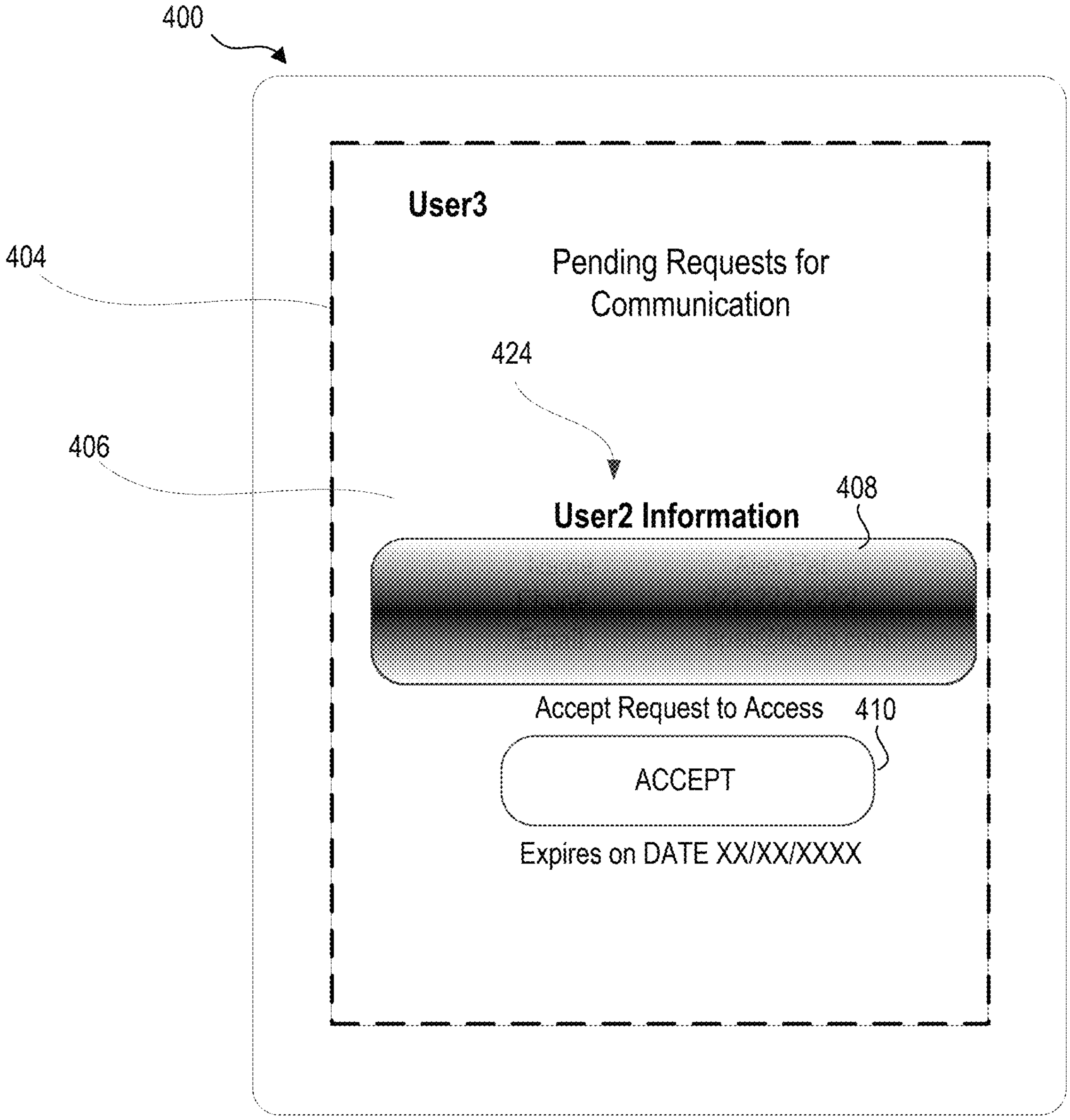
FIGS. 4A and 4B include diagrams of example graphical user interfaces.
Figure 4B:
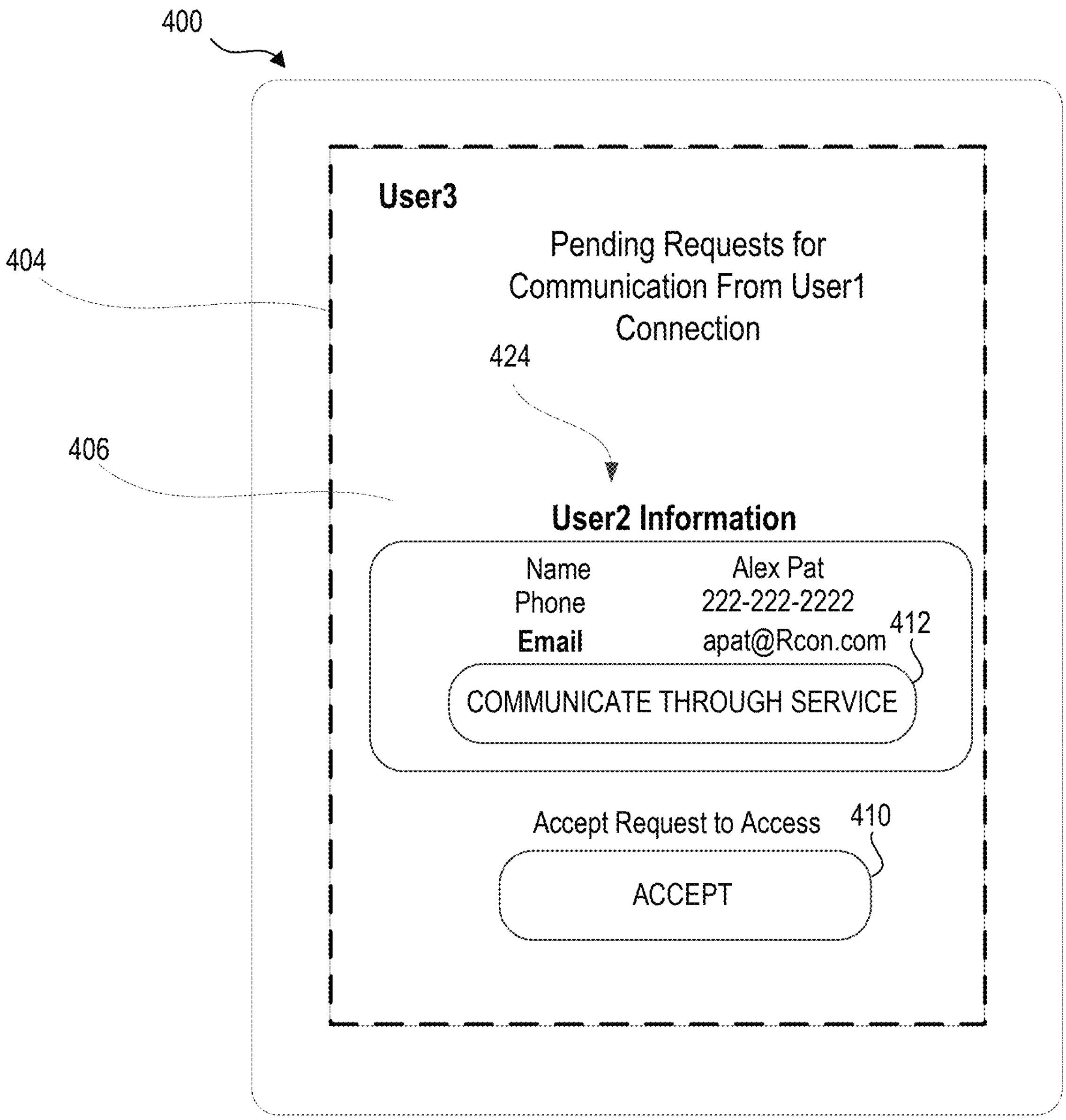

FIGS. 4A and 4B illustrate an example graphical user interface 406 that may be provided on a display 404 of a computing device 400 for protecting the information of the second user from the third user until they accept the communication request. As shown in FIG. 4A, the graphical user interface 406 may identify a pending request for communication from a second user to a third user. The graphical user interface 406 may include information described herein (e.g., identifying information, such as personal or private information, including location information) that is stored in the interactive computing environment for the second user. The information associated with the second user 424 may be redacted, hidden, obscured (e.g., blurred, blacked out, etc.), or otherwise unable to be seen or accessed by the third user on the graphical user interface 406. In one example, the information may be obscured or redacted by a user interface element 408. The graphical user interface 406 may include a button 410 configured to allow the third user to accept the request to communicate or otherwise access the second user's information. After selection of the button 410 and/or providing user authentication information, the information 424 may be displayed to the third user, as shown in FIG. 4B. The information 424 may include alternative forms of communication. The graphical user interface 406 may also, or alternatively, provide the third user with an option 412 (e.g., button) for enabling communication through the interactive computing environment. Upon acceptance of connection request, the third user may also, or alternatively, have access to a document or image (e.g., video or still image) shared by second user in the initial request for communication.

Figure 5:
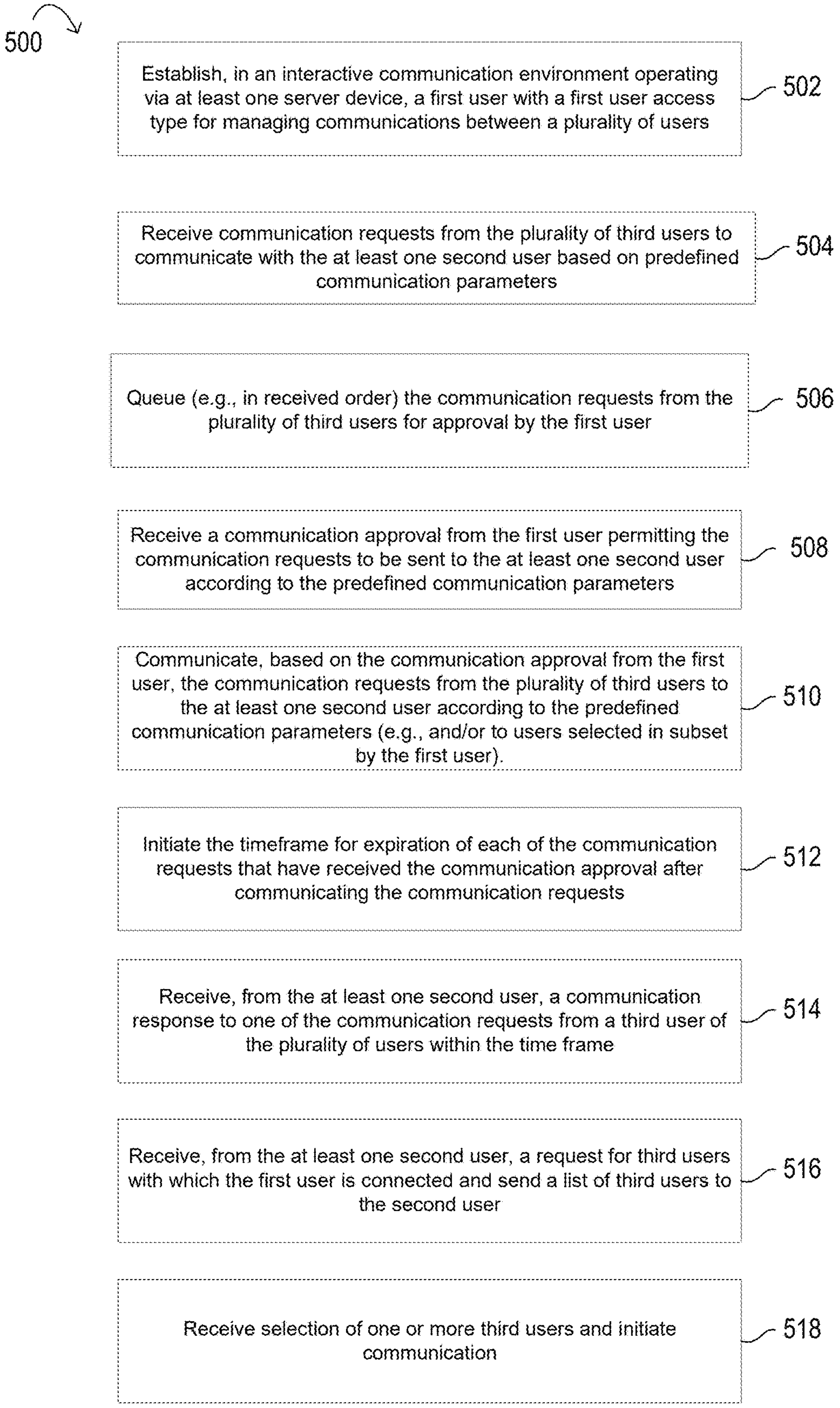
FIG. 5 is an example flow diagram that may be implemented for enabling and/or performing communications in an interactive computing environment.

FIG. 5 is a flow diagram of an example method 500 that may be implemented to create and/or establish users having various access types for performing communications in an interactive computing environment, as described herein. The method 500, or portions thereof, may be performed at a computing device or may be distributed across multiple computing devices (e.g., one or more server devices and/or one or more user devices). One or more portions of the method 500 may be stored in memory as computer-readable and/or machine-readable instructions that may be executed by at least one processor and/or by one or more processing devices. The method 500 may be executed by one or more processing devices (e.g., computing device 210, computing device 230*a*, computing device 230*b*, computing device 230*n*, etc.). Though portions of the method 500 may be described herein as being performed by a particular device, the method 500 may be performed by another device and/or distributed across one or more (e.g., multiple) devices (e.g., computing device 210, computing device 230*a*, computing device 230*b*, computing device 230*n*, one or more system controllers, one or more remote computing devices, etc.). The method 500, or portions thereof, may be performed to enable users, such as administrative users, to customize objectives to be performed by other users in the interactive computing environment. The method 500, or portions thereof, may be performed to collect real-time interactive data from users of the interactive computing environment and provide such data to users, such as the administrative users. In examples, one or more control circuits of one or more processing devices, such as a user device, may execute a control/configuration application for performing one or more portions of the method 500.

As illustrated in FIG. 5, a first user may be established at 502 with a first user access type for managing communications between a plurality of users. The first user access may be configured to allow the first user to communicate (e.g., directly) via the interactive computing environment with at least one second user of the plurality of users having a second user access type in the interactive computing environment and/or a plurality of third users of the plurality of users having a third user access type in the interactive computing environment. The second user access type may permit the at least one second user to identify the plurality of third users, for example, based on identification parameter (s) and/or a relationship between the plurality of third users and the first user in the interactive computing environment. The third user access type may prevent the plurality of third users from (e.g., directly) communicating with the at least one second user in the interactive computing environment without approval of the first user to protect a privacy associated with the at least one third user.

At 504, communication requests (e.g., HTTP request) may be received from one or more third users to communicate with the at least one second user. The communication request may be based on predefined communication parameters. The predefined communication parameters may include one or more of a timeframe for requesting communication, a geographical location, a communication purpose associated with the communication request, a location, a timeframe, response timeframe, and/or a purpose. A user may personalize the communication type. The form of communication may differ based on the type of communication purpose and how the communication is set up (e.g., how to set up different notifications for different purposes). The communication requests may be used to create a session of an interactive computing environment having the characteristics indicated in the communication request. The communication request may include communication parameters for establishing a communication within the interactive computing environment. The communication parameters may include a start date, a start time, an end date, and/or an end time for which users may access the interactive computing environment. The dates and/or times may be entered by a user in a text box and/or a selection in a calendar display, a dropdown menu, and/or other form of user-selection. The communication parameters may include a password that may be used to authenticate the user for enabling communications. The communication parameters may include a location and/or a radius from the location in which users may be located for enabling or performing communications. For example, the location may be an address, a city, or a predefined distance from the address or city. The communication parameters may restrict the communication to a maximum number of users or specific users allowed to access the session. The number of communications from a third user to one or more second users connected to a first user may be limited to a predefined number of communications within a period of time (e.g., week, month, quarter, etc.).

At 506, the communication requests from the plurality of third users may be queued (e.g., in a received order) for approval by the first user. Each communication request may be queued with a time period for expiration. The communication request may be removed from the queue after the expiration of the period of time without approval by the first user or after rejection by the first user. At 508, a communication approval may be received from the first user for permitting the communication request to be sent to the at least one second user according to the predefined communication parameters. The first user may update the communication parameters and/or add additional criteria for enabling communications with the one or more second users. At 510, based on the communication approval from the first user and the communication parameters, the communication requests from the plurality of third users may be communicated to the one or more second users. The communication parameters may include a geographic location of the user, communication(s) within a timeframe, and/or other communication parameters, as described herein.

At 512, the time frame may be initiated for determining an expiration of each of the communication requests. The interactive computing environment may include a (e.g., default) method to follow up with a user. The follow-up method may include a (pre)determined time to initiate the follow-up or reminder that a request is pending in the queue. At 514, a communication response may be received within the timeframe from the at least one second user to one of the communication requests from a third user of the plurality of users. The first user may be made aware of the response and/or the response may be sent to the third user.

In one example, any communication requests from a plurality of third users with a same communication purpose may be cleared from the queue. This may clear memory in the queue, as the second user may select the third user to communicate with for an intended communication purpose and other communications may be cleared from the queue.

Any communication requests from the queue after expiration of the timeframe may also be cleared.

Communications may also, or alternatively, be initiated from second users to third users in the interactive computing environment. At 516, a request may also, or alternatively, be received from a second user for third users that are connected to the first user in the interactive computing environment and a list of third users connected to the first user may be provided. The second user may be provided a list of the third users with which the first user is connected. The third user connections may be displayed with information related to the third user connections.

For example, the third user connections may each be displayed with personal, private information, or business information, such as a name, phone number, address, email address of the user, a business name, a business phone number, a business address, or an email address of a business. The third user connections may be displayed with a location or location information. The third user connections may be displayed with types of desired communications, types of services offered, and/or labels stored with the user in the interactive computing environment. The third user connections may be displayed with the feedback (e.g., a rating, text, etc.) from other second users and/or first users.

The second user may identify one or more third users with which to initiate and/or establish a communication at 518. The communications from the second users to the third users may be performed without the limitations of the communications from the third users to the second users. The communications from the second users may be queued for sending to the one or more third users upon logging into the interactive computing environment and/or upon request. The communication may be removed from the queue after a predefined period of time. This may save on memory resources in the interactive computing environment.

The communications from the second user may be provided to the one or more third users upon logging into the interactive computing environment and/or requesting the queued communication. After the communication is provided or accessed by the third user another notification may be provided to the first user. Monitoring may be performed for identifying return communications from the third user to the second user. Reminders may be sent to the third user to respond to the communication from the second user at predefined periods of time after the receipt of the communication without a return communication. As the third user may have contacted the second user via an alternative form of communication (e.g., email, phone call, etc.), a notification message may be sent to the second user asking whether the third user has contacted the second user. The notification may be simulated to appear as if it is a message sent from the first user. The second user may respond indicating whether they received a communication from the one or more third users (e.g., via an alternative form of communication, such as email, phone call, etc.). The first user may be notified as to whether the one or more third users communicated with the second user (e.g., via an alternative form of communication, such as email, phone call, etc.). The third user may send a communication via the interactive computing environment to the second user. The first user may be notified of the communication from the third user to the first user.

Figure 6:
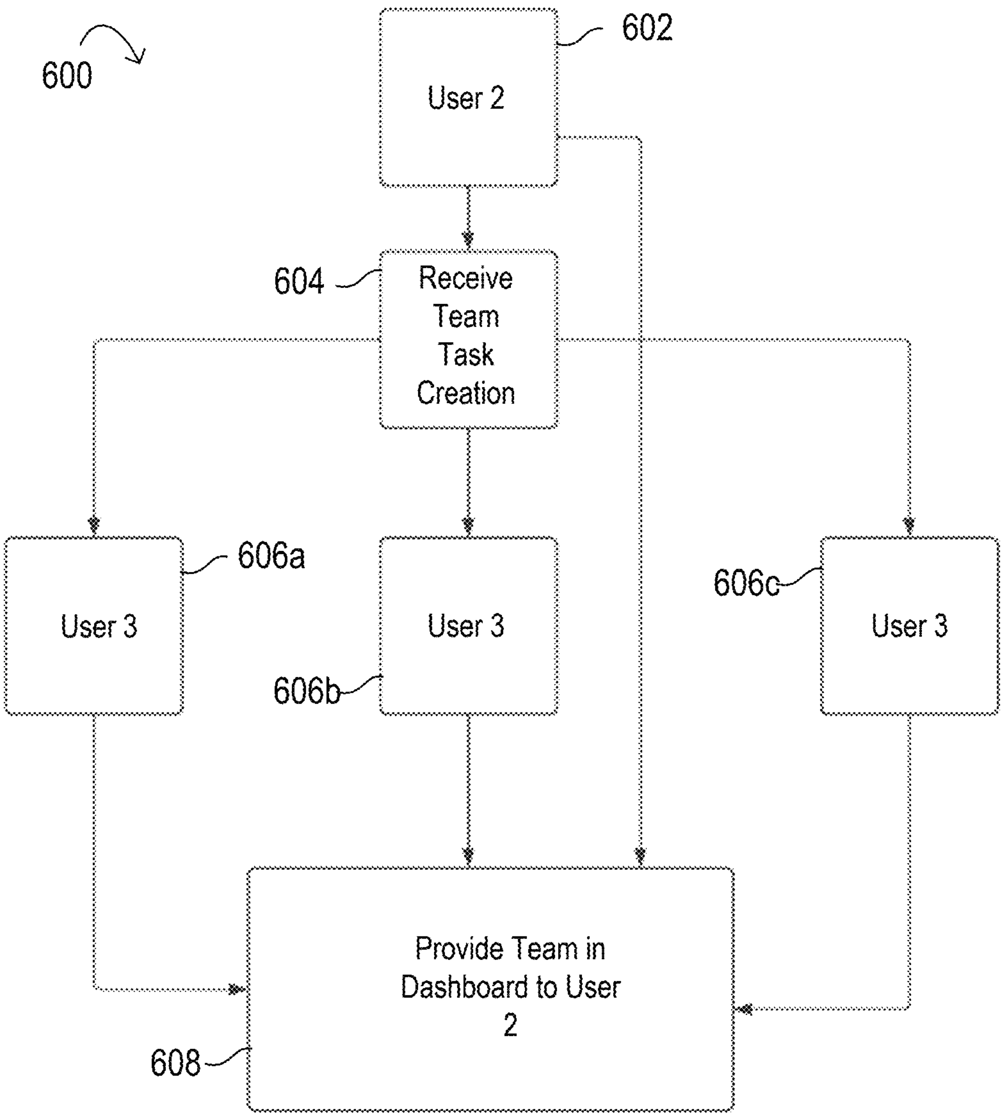
FIG. 6 is an example flow diagram that may be implemented for enabling and/or performing group communications in an interactive computing environment.

The second users having second user access type may send requests for communication to communicate with groups or teams of third users having third user access types. FIG. 6 shows an example flow diagram for creating groups or teams of third users via a second user having a second user access type. As shown in FIG. 6, a second user 602 may send an indication to one or more central computing devices for creating a group or team of third users. The one or more central computing devices may receive the request for creating a group or team of third users for enabling communication with one or more of the third users (e.g., individually, collectively, or in subsets). The second user 602 may request a list of third users connected in the interactive computing environment to one or mor first users. The second user 602 may select one or more third users to invite to the group or team. The third users may be labeled differently within the system. For example, the third users may be labeled with different types of vendors, service providers, business types, or other types of users that may be separately labeled within the interactive computing environment. The second user 602 may invite third users having the same or different labels in the interactive computing environment. One or more of the requested third users may be added to the group or team. For example, a first or predefined first number of third users having the same label that have responded to or accepted the request may be added to the group or team and others may be removed. As multiple third users may respond to accept being a member of the group or team, the second user 602 may select from the third users that have accepted the request for building the group or team. The third users that are not selected or are rejected by the second user after responding to the request may be notified and prevented from being a part of the group or team. A time limit may be imposed on requests to join the group or team and the request for being added to the group or team may be removed from the queue after the period of time without acceptance by the third user.

As shown in FIG. 6, the second user 602 may create a group or team of third users 6061, 606*b*, 606*c*, though any number of third users may be added to the group or team. The group or team may be provided at 608 via the interactive computing environment, such that the second user 602 may communicate with one or more members of the group or team. Each third user 606*a*, 606*b*, 606*c* may be associated with the same or different label. The second user 602 may assign a task or communication and/or a deadline for completion of the task or return communication indicating a completion of the task or communication. Different types of tasks may have a predefined number of third users and/or having different types of labels stored as a template within the interactive computing environment for completion of the task. The second user 602 may modify the template to include different numbers of third users and/or labels. The interactive computing environment may present the second user 602 with one or more predefined tasks for selection and association with one or more third users. The third users having labels associated with a given task or portion of a task may be provided to the second user 602.

After the second user 602 selects the third users 606*a*, 606*b*, 606*c* and the third users have accepted being a part of the group or team, the second user 602 may communicate with one or more of the third users 606*a*, 606*b*, 606*c* with a given communication (e.g., direct or group communications). The second user 602 may be provided the group/team in a group or team dashboard at 608. The third users 606 *a*, 606 *b*, 606 *c* may also be provided with a dashboard for identifying and/or communicating with the second user and/or other third users in the group or team. The dashboard may include each task or communication, a deadline by which the task or a response communication is to be completed or performed, and/or a schedule of each of the tasks/communications from each of the third users.

The interactive computing environment may retain and indicate to the second user 602 a status of communications and/or tasks related to each of the third users 606*a*, 606*b*, 606*c*. The first user with which the second user 602 and/or the third users 606*a*, 606*b*, 606*c* are connected may be updated as to the status of communications and/or tasks. The tasks and/or communications to/from a third user may be predicated on a completion of a task or receipt of a communication from another third user. For example, third user 606*b* may be prompted to provide a communication or initiate a task after receipt of a communication or completion of a task by user 606*a*. The reminders for performance of the communication and/or task may be initiated for the third user 606*b* after the third user 606*b* is prompted. As time goes on, the group or team can be modified by the second user 602 to include additional or fewer members.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method comprising:

establishing, in an interactive computing environment operating via at least one server device, a first user with a first user access type for managing communications between a plurality of users, wherein the first user access type is configured to allow the first user to communicate directly via the interactive computing environment with at least one second user of the plurality of users having a second user access type in the interactive computing environment and a plurality of third users of the plurality of users having a third user access type in the interactive computing environment, wherein the second user access type permits the at least one second user to identify the plurality of third users based on identification parameters and a relationship between the plurality of third users and the first user in the interactive computing environment, and wherein the third user access type prevents the plurality of third users from directly communicating with the at least one second user in the interactive computing environment without an approval of the first user to protect a privacy associated with at least one third user of the plurality of third users;

receiving communication requests from the plurality of third users to communicate with the at least one second user based on predefined communication parameters, wherein the predefined communication parameters comprise a timeframe for requesting communication;

receiving a communication approval from the first user for permitting the communication requests to be sent to the at least one second user according to the predefined communication parameters;

communicating, based on the communication approval from the first user, communications to the at least one second user;

receiving, from the at least one second user, a communication request to communicate with at least one third user of the plurality of third users within the timeframe;

notifying the first user of the communication request to communicate with the at least one third user of the plurality of third users; and receiving, from the at least one third user of the plurality of third users, an acceptance of the communication request from the at least one second user.

2. The method of claim 1, wherein the communication request to communicate with the at least one third user of the plurality of third users comprises a communication purpose.

3. The method of claim 1, comprising queuing the communication requests from the plurality of third users for approval by the first user in a queue, wherein each of the communication requests from the plurality of third users is queued with a time period for expiration.

4. The method of claim 3, comprising:

after receiving the acceptance of the communication request from the second user, clearing, from the queue, any communication requests from the plurality of third users with a same communication purpose.

5. The method of claim 1, comprising notifying the first user when a period of time has passed since the second user sending the communication request to the first user.

6. The method of claim 5, further comprising:

determining that the period of time exceeds the timeframe for requesting communication; and clearing, from a queue, the communication request that exceeds the timeframe for requesting communication.

7. The method of claim 1, further comprising:

registering the at least one second user of the plurality of users in the interactive computing environment.

8. The method of claim 7, wherein registering the at least one second user of the plurality of users in the interactive computing environment comprises:

sending a request to the at least one second user of the plurality of users; and receiving a registration message from the at least one second user of the plurality of users.

9. The method of claim 8, wherein the registration message comprises a username and password associated with the at least one second user of the plurality of users, and wherein registering the at least one second user of the plurality of users in the interactive computing environment is based on the username and password associated with the at least one second user of the plurality of users.

10. The method of claim 1, further comprising:

creating a group of at least two third users of the plurality of third users; and sending a message associated with the at least two third users of the plurality of third users, the message comprising an indication of one or more services provided by the at least two third users of the plurality of third users.

11. At least one non-transitory computer-readable medium having computer-executable instructions stored thereon that are configured to, when executed by at least one processor, cause the at least one processor to:

establish, in an interactive computing environment, a first user with a first user access type for managing communications between a plurality of users, wherein the first user access type is configured to allow the first user to communicate directly via the interactive computing environment with at least one second user of the plurality of users having a second user access type in the interactive computing environment and a plurality of third users of the plurality of users having a third user access type in the interactive computing environment, wherein the second user access type permits the at least one second user to identify the plurality of third users based on identification parameters and a relationship between the plurality of third users and the first user in the interactive computing environment, and wherein the third user access type prevents the plurality of third users from directly communicating with the at least one second user in the interactive computing environment without an approval of the first user to protect a privacy associated with at least one third user of the plurality of third users;

receive communication requests from the plurality of third users to communicate with the at least one second user based on predefined communication parameters, wherein the predefined communication parameters comprise a timeframe for requesting communication;

receive a communication approval from the first user for permitting the communication requests to be sent to the at least one second user according to the predefined communication parameters;

communicate, based on the communication approval from the first user, communications to the at least one second user;

receive, from the at least one second user, a communication request to communicate with at least one third user of the plurality of third users within the timeframe;

notify the first user of the communication request to communicate with the at least one third user of the plurality of third users; and receive, from the at least one third user of the plurality of third users, an acceptance of the communication request from the at least one second user.

12. The at least one non-transitory computer-readable medium of claim 11, wherein the communication request to communicate with the at least one third user of the plurality of third users comprises a communication purpose.

13. The at least one non-transitory computer-readable medium of claim 11, wherein the instructions are configured to, when executed by at least one processor, cause the at least one processor to queue the communication requests from the plurality of third users for approval by the first user in a queue, wherein each of the communication requests from the plurality of third users is queued with a time period for expiration.

14. The at least one non-transitory computer-readable medium of claim 13, wherein the instructions are configured to, when executed by at least one processor, cause the at least one processor to:

after receiving the acceptance of the communication request from the second user, clear, from the queue, any communication requests from the plurality of third users with a same communication purpose.

15. The at least one non-transitory computer-readable medium of claim 11, wherein the instructions are configured to, when executed by at least one processor, cause the at least one processor to notify the first user when a period of time has passed since the second user sending the communication request to the first user.

16. The at least one non-transitory computer-readable medium of claim 15, wherein the instructions are configured to, when executed by at least one processor, cause the at least one processor to:

determine that the period of time exceeds the timeframe for requesting communication; and clear, from a queue, the communication request that exceeds the timeframe for requesting communication.

17. The at least one non-transitory computer-readable medium of claim 11, wherein the instructions are configured to, when executed by at least one processor, cause the at least one processor to:

register the at least one second user of the plurality of users in the interactive computing environment.

18. The at least one non-transitory computer-readable medium of claim 17, wherein the instructions configured to, when executed by at least one processor, cause the at least one processor to register the at least one second user of the plurality of users in the interactive computing environment comprises the instructions configured to, when executed by at least one processor, cause the at least one processor to:

send a request to the at least one second user of the plurality of users; and receive a registration message from the at least one second user of the plurality of users.

19. The at least one non-transitory computer-readable medium of claim 18, wherein the registration message comprises a username and password associated with the at least one second user of the plurality of users, and wherein registering the at least one second user of the plurality of users in the interactive computing environment is based on the username and password associated with the at least one second user of the plurality of users.

20. The at least one non-transitory computer-readable medium of claim 11, wherein the instructions are configured to, when executed by at least one processor, cause the at least one processor to:

create a group of at least two third users of the plurality of third users; and send a message associated with the at least two third users of the plurality of third users, the message comprising an indication of one or more services provided by the at least two third users of the plurality of third users.

* * * * *